(12) United States Patent
Takahashi et al.

(10) Patent No.: US 6,221,800 B1
(45) Date of Patent: Apr. 24, 2001

(54) METHOD OF PRODUCING PTC SEMICONDUCTING CERAMIC

(75) Inventors: Chihiro Takahashi, Chiba-ken; Shigeki Sato, Narita, both of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/296,406

(22) Filed: Apr. 23, 1999

Related U.S. Application Data

(63) Continuation of application No. PCT/JP98/03922, filed on Sep. 2, 1998.

(30) Foreign Application Priority Data

Sep. 5, 1997 (JP) .................................................. 9-257457

(51) Int. Cl.$^7$ .................................................. C04B 35/468
(52) U.S. Cl. ............................. 501/137; 501/138; 501/139
(58) Field of Search ..................... 501/137, 138, 501/139

(56) References Cited

U.S. PATENT DOCUMENTS 6,002,578 * 12/1999 Kumagai et al. ..................... 501/136
6,071,842 * 6/2000 Tahahashi et al. ................... 501/137

FOREIGN PATENT DOCUMENTS

| | | |
|---|---|---|
| 0 694 930 | 1/1996 | (EP) . |
| 57-109301 | * 7/1982 | (JP) . |
| 62-296401 | * 12/1987 | (JP) . |
| 04311002 | 11/1992 | (JP) . |
| 04338601 | 11/1992 | (JP) . |
| 06224006 | 8/1994 | (JP) . |
| 06340472 | 12/1994 | (JP) . |
| 07297009 | 11/1995 | (JP) . |
| 07335404 | 12/1995 | (JP) . |
| 09100157 | 4/1997 | (JP) . |

OTHER PUBLICATIONS

Derwent Publication, AN 1988–038600, JP 62 296401, Dec. 23, 1987.

* cited by examiner

*Primary Examiner*—Karl Group
(74) *Attorney, Agent, or Firm*—Oblon, Spivak, McClelland, Maier & Neustadt, P.C.

(57) ABSTRACT

A method of producing a PTC semiconducting ceramic which entails preparing the calcine of a main composition of barium titanate-based semiconductor containing substantially no Si and having $BaTiO_3$ as a main component thereof, preparing additive compositions, $Ba_2TiSi_2O_8$ and $Ba_nTi_mO_{n+2m}$ ($1 \leq n \leq 4, 2 \leq m \leq 13$, n<m), respectively, compounding the calcine of the main composition and the additive compositions and mixing them, and then subjecting them to formal firing. The obtained product exhibits excellent electrical characteristics, which are not influenced by fluctuations in conditions of production.

13 Claims, 1 Drawing Sheet

US 6,221,800 B1

METHOD OF PRODUCING PTC SEMICONDUCTING CERAMIC

This application is a Continuation of international PCT application PCT/JP 98/03922, filed on Sep. 2, 1998, pending.

BACKGROUND OF THE INVENTION

1. Field of the Invention

The present invention relates to a method of producing a PTC semiconducting ceramic (PTC thermistor) which has a positive temperature coefficient (PTC) and is used in, for example, a low-temperature heating element and an automatic demagnetizer for a color TV and, in particular, to a method of producing a PTC semiconducting ceramic whose characteristic dispersion is small relative to a fluctuation in the producing conditions.

DESCRIPTION OF BACKGROUND

It is known that barium titanate, $BaTiO_3$, which has a perovskite type crystal structure is transformed by the addition of a minute amount of a semiconductor-forming agent, such as a rare earth metal, niobium or antimony into a semiconductor, so as to manifest the PTC (positive temperature coefficient) phenomenon in which the magnitude of resistance abruptly increases at a temperature no less than the Curie point.

In recent years, studies have been actively carried out for elucidating this peculiar phenomenon and finding practical applications, and the semiconducting ceramic compositions of the barium titanate type have been finding actual utility in various heating elements, switching elements, sensors, and automatic demagnetizers of color TV.

Methods which are available for producing such semiconducting ceramic compositions of the barium titanate type include, for example, (1) a solid-phase reaction method which entails using oxides and carbonates as raw materials, compounding them at a given ratio, and then firing them; and (2) a liquid-phase reaction method which entails using a metal alkoxide as a raw material and synthesizing the composition from a liquid phase. The liquid-phase reaction method is advantageous over the solid-phase reaction method in that a homogeneous and stable ceramic composition can be easily obtained, but its production processes are complicated resulting in a high production cost. Consequently, the solid-phase reaction method is generally used.

In the solid-phase reaction method, however, the conditions for producing the ceramic composition by solid-phase reaction, such as the state of mixture of the raw materials, the temperature of firing and the condition of ambience, largely influence the electrical characteristic of the product. Thus, for ensuring a uniform quality over many production lots, the production conditions in the respective producing processes must be strictly managed. It has, thus, been difficult to prepare products of high quality in an inexpensive manner.

Conventionally, the following methods are known:

(1) a method of producing a semiconducting ceramic article which entails compounding a barium titanate type semiconducting material containing a semiconductor-forming agent with a compound, $(Ba_{(2-x)}A_x)TiSi_2O_8$ (wherein A is at least one element selected from the group consisting of Li, Na and K), and then filing them (JP A-4-311002); and (2) a method of producing a thermistor which entails adding to a composition A using barium titanate as a main component and having a minute amount of a semiconductor-forming element or Si, Mn, and Al, a composition B represented by the formula, $BaTi_nO_{n+1}$ (n=2, 3, 4) in an amount of 0.1 to 4.0 mol % relative to 1 mol of the compound A (JP-A-7-297009). The products obtained by these methods, however, still suffer from the disadvantage that their characteristics are liable to be affected by a fluctuation of the conditions of production and, as a result, are liable to be dispersed. Particularly, Li, Na and K which are added in the above technique (1) tend to promote the dispersion of the characteristics. Further, Al which is added in the above technique (2) tends to lower the temperature coefficient.

SUMMARY OF THE INVENTION

Accordingly, it is an object of the present invention to provide, a method of producing a PTC semiconducting ceramic, which entails preparing a calcine of a main composition of a barium titanate-based semiconductor containing substantially no Si and having $BaTiO_3$ as a main component thereof, preparing additive compositions, $Ba_2TiSi_2O_8$ and $Ba_nTi_mO_{n+2}m$ ($1 \leq n \leq 4$, $2 \leq 13$, $n \leq m$), respectively; and compounding the calcine of the main composition and the additive compositions and mixing them, and then subjecting them to formal firing.

DETAILED DESCRIPTION OF THE PREFERRED EMBODIMENTS

Figure 1:
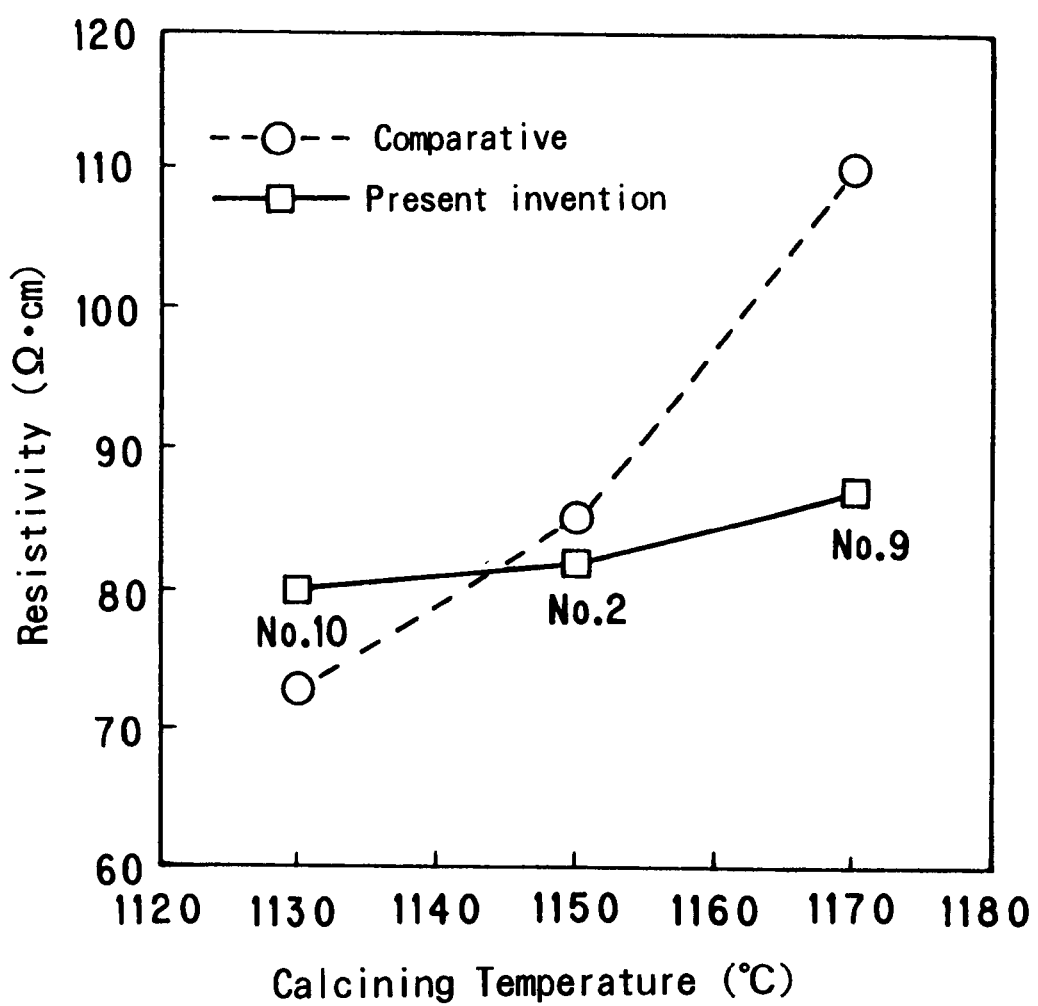
FIG. 1 is a graph showing the relation between the cacining temperature and the resistivity found in the sample of the present invention and the sample of a comparative example.

In a first preferred manner, the present invention is so arranged that the additive compositions are reaction products, respectively, resulting from reaction caused by a heat treatment.

In a second preferred manner, the present invention is so arranged that the content of the $Ba_2TiSi_2O_8$ is in the range of 0.25 mol to 3 mols and the content of the $Ba_nTi_mO_{n+2m}$ ($1 \leq n \leq 4$, $2 \leq m \leq 13$, $n \leq m$) is in the range of 0.03 mol to 6.5 mols, respectively, relative to 100 mols of the main composition of the barium titanate type semiconductor.

In a third preferred manner, the present invention is so arranged that the content of the $Ba_2TiSi_2O_8$ is in the range of 0.35 mol to 2 mols and the content of the $Ba_nTi_mO_{n+2m}$ ($1 \leq n \leq 4$, $2 \leq m \leq 13$, $n \leq m$) is in the range of 0.1 mol to 4 mole, respectively, relative to 100 mols of the main composition of the barium titanate type semiconductor.

In a fourth preferred manner, the present invention is so arranged that the main composition contains a semiconductor forming agent necessary for conversion into a semiconductor.

In a fifth preferred manner, the present invention is so arranged that the main composition contains Mn as a characteristic modifying agent.

In a sixth preferred manner, the present invention is so arranged that calcination of the main composition is carried out at a calcining temperature in the range of 1,000 to 1,400° C.

In a seventh preferred manner, the present invention is so arranged that the reaction by the heat treatment of the additive compositions is performed at a reaction temperature in the range of 1,000 to 1,400° C.

In a eighth preferred manner, the present invention is so arranged that the additive compositions are incorporated in a granular form having an average particle diameter in the range of 0.1 to 3.0 μm.

In a ninth preferred manner, the present invention is so arranged that the formal firing is performed in the open air at a firing temperature in the range of 1,300 to 1,400° C. Brief Now, a preferred embodiment of the present invention will now be described in more detail. A method of producing a PTC semiconducting ceramic according to the present invention begins with the preparation of the calcine of the main composition of the barium titanate type semiconductor containing substantially no Si and having $BaTiO_3$ as a main component thereof. Then, the additive compositions, $Ba_2TiSi_2O_8$ and $Ba_nTi_mO_{n+2m}$ ($1 \leq n \leq 4$, $2 < m \leq 13$, $n \leq m$), are prepared, respectively. Though the additive compositions each may be in the form of either a reaction product resulting from the reaction caused by a heat treatment (in the form of a calcine, for example) or a simple mixture prior to the reaction, they are preferred to be in the former form of the reaction product resulting from the reaction caused by the heat treatment (in the form of the calcine, for example) for the purpose of providing the effect of the present invention to a remarkable extent. The conditions for the heat treatment which are necessary for the formation of the reaction product may be properly selected, depending on the states of the raw materials and the like.

The order in which the calcine of the main composition and the additive compositions are prepared is not particularly limited but may be arbitrarily decided. Thereafter, they are mixed in a given ratio and then subjected to formal firing to produce a PTC semiconducting ceramic.

The semiconducting ceramic product which is obtained by first preparing the calcine of the main composition of a given formula and the two types of additive compositions mentioned above, then mixing them in the given ratio and subjecting them to formal firing as described above ensures the stable quality because the product is excellent in electrical characteristic and the electrical characteristic is not easily affected by a fluctuation of the conditions of production.

Though the calcine of the main composition of the barium titanate type semiconductor mentioned above is generally set such that the ratio, A/B (molar ratio), in the $ABO_3$ type barium titanate contained in the main composition becomes 1, the ratio may deviate more or less from A/B=1 as long as the operation and effect of the present invention can be achieved. Here, A represents a divalent element such as Ba, Ca or Pb, and B represents a tetravalent element such as Ti, Zr or Sn.

The main composition contains a semiconductor-forming agent for conversion into a semiconductor. It is preferable that the semiconductor-forming agent be at least one selected from the group consisting of Y, rare earth elements (La, Ce, Pr, Nd, Pm, Eu, Gd, Tb, Dy, Ho, Er, Tm, Yb, Lu), Nb, Ta, W, Sb, Bi, and Th. In view of raw material cost, it is preferred to use at least one selected from the group consisting of Y, La, Ce, Nb, Ta, and Sb.

These elements may be contained in the main composition in such a form as to substitute part of the component elements, such as Ba and Ti, of the perovskite type oxide having $BaTiO_3$ as a main constituent.

The content of the semiconductor-forming agent in the main composition is generally preferred to be in the range of 0.03 to 0.5 wt. % as an oxide.

The main composition is preferred to contain Mn as a characteristic modifying agent. By containing Mn, the resistant temperature coefficient can be increased. Mn may be contained in the main composition in such a form as to substitute part of the component elements of the perovskite type oxide. The content of Mn in the main composition is preferred to be no greater than 0.1 wt. %, particularly, to be about 0.01 to 0.05 wt. % as MnO.

It is necessary that the main composition should contain substantially no Si, so as to obtain the product of the stable quality free of dispersion. Even when Si is contained as an impurity, the content thereof is preferred to be not more than 500 ppm.

The main composition in the present invention is produced by compounding the raw materials in accordance with the formula of the main composition and then calcining them. As the raw materials in this case, oxides or compound oxides are used. Otherwise, they may be properly selected from various compounds, such as carbonates, oxalates, nitrates, hydroxides and organic metal compounds, which are converted by firing into such oxides or compound oxides as mentioned above. These raw materials are generally used in the form of powder having an average particle diameter in the approximate range of 0.1 to 3 μm.

As the raw materials for the perovskite type oxide, $BaTiO_3$, in the main composition, $BaCO_3$, $TiO_2$, etc. are used. Additionally, $SrCO3$, $CaCO_3$, etc., may be added as occasion demands.

As the raw materials for the semiconductor-forming agent, $Y_2O_3$, $La_2O_3$, $Ce_2O_3$, $Nb_2O_5$, $Ta_2O_5$, $Sb_2O_5$, etc. are used.

As the raw material for Mn which is preferred to be added for the improvement of characteristics, $MnCO_3$, aqueous $Mn(NO_3)_2$ solution or the like is used.

The mixture may be carried out in a dry mode or a wet mode. In case of the wet mode, the calcination may be performed after drying.

The calcination is preferred to be performed at a calcining temperature in the range of 1,000 to 1,400° C. If this temperature is too low, the perovskite phase, $BaTiO_3$, will not be formed thoroughly. If the temperature is too high, the pulverization becomes difficult. More preferably, the calcining temperature is set in the range of 1,100 to 1,400° C. where unaltered $TiO_2$ is decreased, so as to reduce an influence on the electrical characteristic when the temperature fluctuates. The calcining time, when expressed as a so-called maximum temperature holding time in the calcination, is generally in the approximate range of 0.5 to 6 hours. The temperature increasing or decreasing rate of the calcination may be in the approximate range of 100° C./hour to 500° C./hour. The calcination is carried out in an oxidizing atmosphere. Generally, it is performed in the open air.

The first additive composition in the present invention is represented as $Ba_2TiSi_2O_8$. It is obtained by compounding the raw materials (with Ba in an excess amount) depending on the formula, mixing them, and subjecting them to a heat treatment for a reaction (for example, calcination).

The raw materials may be properly selected from the same substances as used for the main composition mentioned above. As the Ba and Ti sources, $BaCO_3$, $TiO_2$, etc. may be Mentioned. As the Si source, $SiO_2$, for example, may be used. These raw materials may be mixed in a dry mode or a wet mode. When the wet mode is adopted, a heat treatment may be performed after drying so as to obtain the reaction product.

The reaction by the heat treatment in this case is preferred to be performed at a reaction temperature in the range of 1,000 to 1,400° C. If the temperature is too low the phase will not be formed with sufficient homogeneity. If the temperature is too high, the pulverization becomes difficult. The other conditions for the reaction by this heat treatment may be the same as those adopted in the case of the main composition mentioned above. The formation of the $Ba_2TiSi_2O_8$ phase is confirmed by the X ray diffraction (XRD) because this phase manifests itself in the form of a (211) plane peak in the range of 25 to 30 deg. of the X-ray diffraction chart.

The second additive composition in the present invention is represented as $Ba_nTi_mO_n+2m$ ($1 \leq n \leq 4, 2 \leq m \leq 13, n \leq m$). It is obtained by compounding the raw materials (with Ti in an excess amount) depending on the formula, mixing them, and subjecting them to a heat treatment for a reaction (for example, calcination). The raw materials may be properly selected from the same substances as used for the main composition mentioned above. As the Ba and Ti sources, $BaCO_3$, $TiO_2$, etc. may be cited.

As respects the mode of mixture of the raw materials and the conditions for the reaction by the heat treatment, those mentioned above with respect to the first additive composition ($Ba_2TiSiO_8$) may be applied. $Ba_nTi_mO_{n+2m}$ is a barium titanate type compound which is confirmed by the X-ray diffraction (XRD) as it manifests itself in the range of 25 to 30 deg. of the X-ray diffraction chart, wherein n<m, indicating a Ti excess phase. The calcine of the main composition and the additive compositions, $Ba_2TiSi_2O_8$ and $Ba_nTi_mO_{n+2m}$ ($1 \leq n \leq 4, 2 \leq 13,$ n m) (preferably the reaction products resulting from the reaction caused by the heat treatment (in the form of the calcine, for example)) which have been produced as described above are compounded in given amounts and then mixed. In this case, the additive compositions in the form of reaction products resulting from the reaction caused by the heat treatment are preferred to have been pulverized in advance. The pulverization may be carried out in a dry mode or a wet mode. When the wet mode is adopted, they may be pulverized and then dried. The additive compositions after the pulverization are preferred to have an average particle diameter in the approximate range of 0.1 to 3.0 $\mu$m.

In the compounding, the first additive composition, $Ba_2TiSi_2O_8$, is contained in an amount in the range of 0.25 mol to 3 mols, preferably 0.35 mol to 2 mols, relative to 100 mols of the main composition of the barium titanate type semiconductor. If this amount is less than 0.25 mol or greater than 3 mols, the product characteristic itself is adversely affected because the product manifests a poor sintering property or is not converted into a semiconductor. The aforementioned compound, $Ba_nTi_mO_{n+2m}$ ($1 \leq n \leq 4, 2 \leq m \leq 13$, n<m), which forms the second additive composition, is contained in an amount in the range of 0.03 mol to 6.5 mols, preferably 0.1 mol to 4 mols, relative to 100 mols of the main composition of the barium titanate type semiconductor. If this amount is less than 0.03 mol or greater than 6.5 mols, the product characteristic itself is adversely affected because the product manifests a poor sintering property or is not converted into a semiconductor.

As an example of a concrete mixing method, it comprises adding to the calcine of the main composition mentioned above the additive composition pulverized as described above in given amounts, and pulverizing and mixing them. The pulverization and mixture are generally preferred to be performed in a wet mode, followed by drying. The pulverized mixture thus obtained is preferred to have an average particle diameter in the approximate range of 0.5 to 2.0 $\mu$m.

The pulverized mixture thus formed is formed in a given shape and then subjected to formal firing. For the purpose of facilitating the formation of this shaped mass, the pulverized mixture may be added with a binder. As the binder, polyvinyl alcohol (PVA) may be advantageously used, for example. The amount of the binder to be added is generally in the approximate range of 0.5 to 5.0 wt. % relative to the amount of the pulverized mixture. The formal firing is preferred to be performed in an oxidizing atmosphere, preferably in the open air. The firing temperature is preferred to be in the range of 1,300 to 1,400° C. If the firing temperature is too low, the resistivity of the ceramic as the product is not reduced so that it is not sufficiently converted into a semiconductor. If the firing temperature is too high, abnormal grain growth tends to occur.

The firing time of the formal firing, when expressed as a maximum temperature holding time in the firing, is generally in the approximate range of 0.5 to 4.0 hours. The temperature increasing or decreasing rate of the firing may be in the approximate range of 100° C./hour to 500° C./hour.

In the present invention, the barium titanate type semiconductor of the main composition (particularly with the aforementioned A/B ratio set at 1) is prepared in the form of a calcine and then the additive compositions, $Ba_2TiSi_2O_8$ and $Ba_nTi_mO_{n+2m}$ ($1 \leq n \leq 4, 2 \leq m \leq 13, n \leq m$) (each preferably in the form of a compound resulting from a reaction) are added thereto. Accordingly, the PTC semiconducting ceramic can be obtained which has very small dispersion in product quality characteristic relative to fluctuation in condition of production, such as the condition of calcination of the main composition and an atmosphere for the calcination. The average grain size of the sinter is generally in the approximate range of 1 to 100 $\mu$m, though variable depending on the formula of composition, the firing conditions, etc. This grain size can be derived from an optical microscope photograph or a scanning electron microscope (SEM) photograph of a section of the sinter which has been mirror-polished and etched. In the sinter, $SiO_2$ is mainly present in the so-called triple point, i.e. the region enclosed with the grains (particles) of the perovskite layer, the semiconductor-forming agent is mainly present within the grains, and Mn is present within grains and along grain boundaries in the preferred range of the addition amount thereof.

In the present invention, the PTC semiconducting ceramic can be obtained with the given characteristics, depending on the purpose and use. For example, the resistivity at room temperature (25° C.), $\rho_{25}$, is in the range of 10 to 400 $\Omega$.cm (preferably 40 to 100 $\Omega$.cm) and the resistant temperature coefficient $\alpha$ is in the range of 10 to 20%/°C.

The resistivity $\rho_{25}$ represents a value which is measured in an atmosphere kept at 25° C., using a sample produced by forming electrodes on the opposite main surfaces of a disc-shaped semiconducting ceramic with a diameter of 14 mm and a thickness of about 2.5 mm, by application of an In-Ga alloy. The resistant temperature coefficient a is determined by measuring the resistance of the sample while varying the temperature thereof and calculating the following formula (1) wherein T1 represents the temperature at which the resistance is twice the minimum resistance and T2 represents the temperature at which the resistance is 200 times the minimum resistance.

$$\alpha = [4.606/(T2-T1)] \times 100 \tag{1}$$

The PTC semiconducting ceramic which is obtained by the method of production according to the present invention can be used for the automatic control type heater (constant temperature heating element), for the temperature sensor and for the purpose of the demagnetizing of the color TV or preventing the color TV from overcurrent.

Now, the present invention will be described in more detail below with reference to concrete examples.

Test Example 1

Production of Main Composition

BaCO$_3$ (average particle diameter 1 μm), SrCO$_3$ (average particle diameter 1 μm), TiO$_2$ (average particle diameter 1 μm), Y$_2$O$_3$ (average particle diameter 3 μm) and an aqueous Mn(NO$_3$)$_2$ solution (0.1 mol aqueous solution) were prepared and they were compounded at a compounding ratio shown in Table 1 below. Then, they were wet mixed in a ball mill, dried and then calcined under calcining conditions shown in Table 1 to obtain calcines of main compositions. Part of Ba in the main composition could be substituted by any of the elements Sr, Ca, and Y. As noted from the compounding ratios shown in Table 1, the A/B ratios of the main compositions indicated in Table 1 were 1.

Production of Additive Compositions (1) Production of Additive Composition Ba$_2$TiSi$_2$O$_8$ BaCO$_3$ (average particle diameter 1 μm), TiO$_2$ (average particle diameter 1 μm) and SiO$_2$ (average particle diameter 3 μm) were prepared and they were compounded at a compounding ratio shown in Table 1 below. Then, they were wet mixed in a ball mill, dried and then heat-treated to obtain the reaction product, Ba$_2$TiSi$_2$O$_8$. The heat treatment was performed in the open air at a heat treatment temperature of 1,150° C. for a heat treatment time of 120 minutes (retention time). This reaction product was coarsely pulverized in a wet state and then dried to obtain the additive composition, Ba$_2$TiSi$_2$O$_8$. This additive composition had an average particle diameter of 1 μm.

(2) Production of Additive Composition, Ba$_n$Ti$_m$O$_{n+2m}$ ($1 \leq n < 4$, $2 < m < 13$, $n < m$)

BaCO$_3$ (average particle diameter 1 μm) and TiO$_2$ (average particle diameter 1 μm) were prepared and they were compounded at a compounding ratio shown in Table 1 below. They were wet mixed in a ball mill, dried and heat-treated to obtain the reaction product, Ba$_n$Ti$_m$O$_{n+2m}$. The heat treatment was performed in the open air at a heat treatment temperature of 1,150° C. for a heat treatment time of 120 minutes (retention time). This reaction product was coarsely pulverized in a wet state in a ball mill and then dried to obtain the additive composition, Ba$_n$Ti$_m$O$_{n+2m}$. This additive composition had an average particle diameter of 1 μm. In Table 1, Sample No. 17 was formed mostly of a compound represented by the formula with n=1 and m=2, Sample No. 18 mostly of a compound represented by the formula with n=2 and m=5, Sample No. 19 mostly of a compound represented by the formula with n=2 and m=9, and the other samples mostly of a compound represented by the formula with n=4 and m=13.

Production of Semiconductor Ceramic Material

The additive composition mentioned above were compounded with the main composition at a compounding ratio shown in Table 1, and they were mixed as wet pulverized in a ball mill for 4 hours, then dried to produce a semiconducting ceramic material. This material had an average particle diameter of 1 μm. The term "Conc. 1" given in Table 1 represents the content of Ba$_2$TiSi$_2$O$_8$ in the main composition of the barium titanate type semiconductor expressed in mol % relative to 100 mols of the main composition, and the term "Conc. 2" given in Table 1 represents the content of Ba$_n$Ti$_m$O$_{n+2m}$ in the main composition of the barium titanate type semiconductor expressed in mol % relative to 100 mols of the main composition.

Production of Semiconducting Ceramic

The semiconducting ceramic material mentioned above and polyvinyl alcohol (PVA) added as a binder thereto in a proportion of 2 wt. % were together granulated and then press formed into discs. The discs were subjected to formal firing in the open air at 1350° C. for two hours (retention time) to produce disc-like semiconducting ceramic samples (Samples Nos. 1 to 24) having a diameter of 14 mm and a thickness of 2.5 mm.

The semiconducting ceramic samples thus obtained, with an In-Ga alloy applied to the opposite main surfaces thereof, were tested for resistivity $\rho_{25}$ at room temperature as an electrical property. The obtained semiconducting ceramic samples were confirmed to have a positive temperature coefficient (PTC).

The results are shown in Table 1 below.

TABLE 1

| Sample No. | Components of main composition as oxide (mol) | | | | | | Calcining conditions for main composition | Ba$_2$TiSi$_2$O$_8$ (components) as oxide (mol) | | | Conc. 1 mol % | Ba$_n$Ti$_m$O$_{(n+2m)}$ (components) as oxide (mol) | | Conc. 2 mol % | Room temperature Resistivity $\rho_{25}$ ($\Omega \cdot$ cm) |
|---|---|---|---|---|---|---|---|---|---|---|---|---|---|---|---|
| | BaO | SrO | CaO | YO$_{3/2}$ | TiO$_2$ | MnO | | BaO | TiO$_2$ | SiO$_2$ | | BaO | TiO$_2$ | | |
| 1 | 0.765 | 0.200 | 0.030 | 0.005 | 1.000 | 0.001 | 1150° C., 110 min., open air | 0.011 | 0.006 | 0.011 | 0.56 | 0.015 | 0.048 | 0.370 | 90 |
| 2 | 0.765 | 0.200 | 0.030 | 0.005 | 1.000 | 0.001 | 1150° C., 110 min., open air | 0.015 | 0.008 | 0.015 | 0.75 | 0.012 | 0.040 | 0.310 | 83 |
| 3 | 0.765 | 0.200 | 0.030 | 0.005 | 1.000 | 0.001 | 1150° C., 110 min., open air | 0.006 | 0.003 | 0.006 | 0.28 | 0.010 | 0.031 | 0.240 | 92 |
| 4 | 0.765 | 0.200 | 0.030 | 0.005 | 1.000 | 0.001 | 1150° C., 110 min., open air | 0.011 | 0.006 | 0.011 | 0.56 | 0.010 | 0.031 | 0.240 | 53 |
| 5 | 0.765 | 0.200 | 0.030 | 0.005 | 1.000 | 0.001 | 1150° C., 110 min., open air | 0.006 | 0.003 | 0.006 | 0.28 | 0.007 | 0.023 | 0.180 | 102 |
| 6 | 0.765 | 0.200 | 0.030 | 0.005 | 1.000 | 0.001 | 1150° C., 110 min., open air | 0.017 | 0.009 | 0.017 | 0.85 | 0.010 | 0.031 | 0.240 | 62 |
| 7* | 0.765 | 0.200 | 0.030 | 0.005 | 1.000 | 0.001 | 1150° C., 110 min., open air | 0.004 | 0.002 | 0.004 | 0.20 | 0.018 | 0.059 | 0.450 | >10$^6$ |
| 8 | 0.765 | 0.200 | 0.030 | 0.005 | 1.000 | 0.001 | 1150° C., 110 min., open air | 0.056 | 0.028 | 0.056 | 2.80 | 0.012 | 0.040 | 0.310 | 2023 |
| 9 | 0.765 | 0.200 | 0.030 | 0.005 | 1.000 | 0.001 | 1170° C., 110 min., open air | 0.015 | 0.008 | 0.015 | 0.75 | 0.012 | 0.040 | 0.310 | 87 |

TABLE 1-continued

| Sample No. | Components of main composition as oxide (mol) | | | | | | Calcining conditions for main composition | $Ba_2TiSi_2O_8$ (components) as oxide (mol) | | | Conc. 1 mol % | $Ba_nTi_mO_{(n+2m)}$ (components) as oxide (mol) | | Conc. 2 mol % | Room temperature Resistivity $\rho_{25}$ ($\Omega \cdot cm$) |
|---|---|---|---|---|---|---|---|---|---|---|---|---|---|---|---|
| | BaO | SrO | CaO | $YO_{3/2}$ | $TiO_2$ | MnO | | BaO | $TiO_2$ | $SiO_2$ | | BaO | $TiO_2$ | | |
| 10 | 0.765 | 0.200 | 0.030 | 0.005 | 1.000 | 0.001 | 1130° C., 110 min., open air | 0.015 | 0.008 | 0.015 | 0.75 | 0.012 | 0.040 | 0.310 | 80 |
| 11* | 0.765 | 0.200 | 0.030 | 0.005 | 1.000 | 0.001 | 1170° C., 110 min., open air | 0.002 | 0.001 | 0.002 | 0.12 | 0.001 | 0.003 | 0.020 | 53 |
| 12* | 0.765 | 0.200 | 0.030 | 0.005 | 1.000 | 0.001 | 1130° C., 110 min., open air | 0.002 | 0.001 | 0.002 | 0.12 | 0.001 | 0.003 | 0.020 | 13 |
| 13 | 0.765 | 0.200 | 0.030 | 0.005 | 1.000 | 0.001 | 1150° C., 110 min., under $CO_2$ | 0.015 | 0.008 | 0.015 | 0.75 | 0.012 | 0.040 | 0.310 | 86 |
| 14 | 0.765 | 0.200 | 0.030 | 0.005 | 1.000 | 0.001 | 1150° C., 110 min., under $N_2$ | 0.015 | 0.008 | 0.015 | 0.75 | 0.012 | 0.040 | 0.310 | 80 |
| 15* | 0.765 | 0.200 | 0.030 | 0.005 | 1.000 | 0.001 | 1150° C., 110 min., under $CO_2$ | 0.002 | 0.001 | 0.002 | 0.12 | $3 \times 10^{-4}$ | 0.001 | 0.008 | 40 |
| 16* | 0.765 | 0.200 | 0.030 | 0.005 | 1.000 | 0.001 | 1150° C., 110 min., under $N_2$ | 0.002 | 0.001 | 0.002 | 0.12 | $3 \times 10^{-4}$ | 0.001 | 0.008 | 12 |
| 17 | 0.765 | 0.200 | 0.030 | 0.005 | 1.000 | 0.001 | 1150° C., 110 min., open air | 0.015 | 0.008 | 0.015 | 0.75 | 0.028 | 0.056 | 2.820 | 83 |
| 18 | 0.765 | 0.200 | 0.030 | 0.005 | 1.000 | 0.001 | 1150° C., 110 min., open air | 0.015 | 0.008 | 0.015 | 0.75 | 0.018 | 0.046 | 0.913 | 88 |
| 19 | 0.765 | 0.200 | 0.030 | 0.005 | 1.000 | 0.001 | 1150° C., 110 min., open air | 0.015 | 0.008 | 0.015 | 0.75 | 0.008 | 0.035 | 0.391 | 92 |
| 20* | 0.765 | 0.200 | 0.030 | 0.005 | 1.000 | 0.001 | 1150° C., 110 min., open air | 0.070 | 0.035 | 0.070 | 3.50 | 0.012 | 0.040 | 0.310 | $>10^6$ |
| 21 | 0.765 | 0.200 | 0.030 | 0.005 | 1.000 | 0.001 | 1150° C., 110 min., open air | 0.011 | 0.006 | 0.011 | 0.56 | 0.200 | 0.650 | 5.000 | 1560 |
| 22 | 0.765 | 0.200 | 0.030 | 0.005 | 1.000 | 0.001 | 1150° C., 110 min., open air | 0.011 | 0.006 | 0.011 | 0.56 | 0.252 | 0.819 | 6.300 | 2420 |
| 23* | 0.765 | 0.200 | 0.030 | 0.005 | 1.000 | 0.001 | 1150° C., 110 min., open air | 0.011 | 0.006 | 0.011 | 0.56 | 0.288 | 0.936 | 7.200 | $>10^6$ |
| 24* | 0.765 | 0.200 | 0.030 | 0.005 | 1.000 | 0.001 | 1150° C., 110 min., open air | 0.011 | 0.006 | 0.011 | 0.56 | $4 \times 10^{-4}$ | $1.3 \times 10^{-3}$ | 0.010 | $>10^6$ |

The asterisk (*) represents a sample departing from the scope of this invention (sample of comparative example).

The effect of the present invention is evident from the results shown in Table 1.

Now, attention is directed particularly to the data of Sample No. 2, Sample No. 9, Sample No. 10, Sample No. 13 and Sample No. 14. These semiconducting ceramic samples were all equal in composition and different only in temperature condition and calcining atmosphere of the calcining conditions for the main composition. In other words, in the collection of the data, the calcining conditions for the main compositions were varied in consideration of the possibility of fluctuation of the actual process of production. It is seen that the product samples obtained in accordance with the producing method of the present invention acquired uniform qualities free of dispersion as evinced by the fact that they produced virtually no change in the magnitude of the resistivity p in spite of fluctuations in process.

Sample No. 13 and Sample No. 14 as a pair and Sample No. 15 and Sample No. 16 as another pair were respectively equal in the pairs in terms of the formula of the main compositions and the calcining conditions for the main compositions. It is noted, however, that the pair of Sample No. 15 and Sample No. 16 assumed slightly lower values of the resistivity $\rho_{25}$ and moreover produced dispersions in the magnitude of the resistivity $\rho_{25}$ in consequence of fluctuations in the calcining conditions for the main compositions (variations in the calcining atmosphere) because the containing proportions of the additive compositions were in the unpreferred ranges.

Test Example 2

With respect to the production of the semiconducting ceramic sample No. 1 in Test Example 1 above, the respective heat treatments of the main composition and the additive compositions were not performed, and these raw materials were mixed and stirred altogether, then calcined, and thereafter subjected to formal firing (comparative test). As a result, the sample obtained with a calcining temperature of 1,130° C. was found to have a resistivity $\rho_{25}$ of 73 $\Omega$.cm, the sample obtained with a calcining temperature of 1,150° C. to have a resistivity $\rho_{25}$ of 85 $\Omega$.cm, and the sample obtained with a calcining temperature of 1,170° C. to have a resistivity $\rho_{25}$ of 110 $\Omega$.cm. Thus, the magnitude of the resistivity $\rho_{25}$ was dispersed in consequence of the fluctuations in the calcining conditions (variations in the calcining atmosphere) for the main compositions.

The data of resistivity $\rho_{25}$ obtained of the three samples for comparison in this comparative test and the data of resistivity $\rho_{25}$ obtained of Samples No. 2, No. 9, and No. 10 of the present invention shown in Table 1 above were graphically compared in FIG. 1. It is seen from the graph shown in FIG. 1 that in the samples of the present invention, there is very small dispersion in magnitude of resistivity $\rho_{25}$ in consequence of fluctuations in the calcining conditions (variations in the calcining atmosphere) used for the main compositions.

The effect of the present invention is evident from the results described above. Specifically, since the method of producing the PTC semiconducting ceramic according to the present invention comprises preparing the calcine of a main composition of barium titanate type semiconductor containing substantially no Si and having $BaTiO_3$ as a main component thereof, preparing additive compositions, $Ba_2TiSi_2O_8$ and $Ba_nTi_mO_{n+2m}$ ($1 \leq n \leq 4$, $2 < m < 13$, $n < m$), respectively, compounding the calcine of the main composition and the additive compositions and mixing them, and then subjecting them to formal firing, the obtained product manifests very excellent effects, i.e. being excellent in electrical characteristic, rendering the electrical characteristic not liable to be influenced by the fluctuation in conditions of production, and thus ensuring the stable quality.

The PTC semiconducting ceramic obtained by the producing method of the present invention can be used for the automatic control type heater (constant temperature heating element), for the temperature sensor, and for the purpose of demagnetizing of the color TV or preventing the color TV from overcurrent.

What is claimed is:

1. A method of producing a PTC semiconducting ceramic, which comprises:

(a) preparing a calcine of a main composition of a barium titanate-based semiconductor containing substantially no Si and having $BaTiO_3$ as a main component thereof and a semi-conductor forming element or oxide thereof;

(b) preparing additive compositions, $Ba_2TiSi_2O_8$ and $Ba_nTi_mO_{n+2m}$ ($1 \leq n \leq 4, 2 \leq m \leq 13, n \leq m$), respectively; and (c) compounding said calcine of the main composition and said additive compositions and mixing them, and then subjecting them to formal firing.

2. The method of claim 11, wherein said additive compositions are reaction products, respectively, formed from reaction caused by a heat-treatment.

3. The method of claim 11, wherein the content of said $Ba_2TiSi_2O_8$ is in the range of 0.25 mol to 3 mols and the content of said $Ba_nTi_mO_{n+2m}$ ($1 \leq n \leq 4, 2 \leq m \leq 13$, n<m) is in the range of 0.03 mol to 6.5 mols, respectively, relative to 100 mols of said main composition of the barium titanate-based semiconductor.

4. The method of claim 1, wherein the content of said $Ba_2TiSi_2O_8$ is in the range of 0.35 mol to 2 mols and the content of said $Ba_nTi_mO_{n+2m}$ ($1 \leq n \leq 4, 2 \leq m \leq 13$, n<m) is in the range of 0.1 mol to 4 mols, respectively, relative to 100 mols of the main composition of the barium titanate-based semiconductor.

5. The method of claim 1, wherein said main composition further comprises Mn.

6. The method of claim 5, wherein Mn is present in an amount of not greater than 0.1 wt. % as MnO.

7. The method of claim 1, wherein calcination of said main composition is carried out at a calcining temperature in the range of 1000 to 1400° C.

8. The method of claim 2, wherein the reaction by the heat treatment to form said additive compositions is performed at a reaction temperature in the range of 1000° to 1400° C.

9. The method of claim, 2 wherein said additive compositions are incorporated in a granular form having an average particle diameter in the range of 0.1 to 3.0 μm.

10. The method of claim 1, wherein said formal firing is performed in open air at a firing temperature in the range of 1300° to 1400° C.

11. The method of claim 6, wherein the amount of MnO is about 0.01 to 0.05 wt %.

12. The method of claim 1, wherein said semi-conductor forming element or oxide is produced from compounds of elements selected from the group consisting of Y, La, Ce, Pr, Nd, Pm, Eu, Gd, Tb, Dy, Ho, Er, Tm, Yb, Lu, Nb, Ta, W, Sb, Bi and Th; said compounds being selected from the group consisting of oxides, carbonates, oxalates, nitrates, hydroxides, and organic metal compounds.

13. The method of claim 12, wherein said compounds of said elements have an average particle diameter in the range of 0.1 to 3 μm.

* * * * *